(12) United States Patent
Chembars

(10) Patent No.: US 6,672,567 B1
(45) Date of Patent: Jan. 6, 2004

(54) WIRE GUIDE FOR ELECTRICAL BOXES

(76) Inventor: Guy A. Chembars, 1620 Duffy Grizzle Rd., Dahlonega, GA (US) 30533

( * ) Notice: Subject to any disclaimer, the term of this patent is extended or adjusted under 35 U.S.C. 154(b) by 0 days.

(21) Appl. No.: 10/435,064

(22) Filed: May 10, 2003

(51) Int. Cl.[7] .............................................. E21C 29/16
(52) U.S. Cl. .............................................. 254/134.3 FT
(58) Field of Search ................................ 254/134.3 FT, 254/134.3 PA, 390, 415, 413; 220/3.2, 3.5; 226/179, 180, 194; 248/63, 231.1, 291

(56) References Cited

U.S. PATENT DOCUMENTS

| 4,358,089 A | 11/1982 | Metcalf |
| 4,541,615 A | 9/1985 | King, Jr. |
| 4,946,137 A | 8/1990 | Adamczek |
| 5,271,605 A | 12/1993 | Damron |

*Primary Examiner*—Robert C. Watson
(74) *Attorney, Agent, or Firm*—Kenneth S. Watkins, Jr.

(57) ABSTRACT

A wire guide for electrical boxes utilizes a wire-guiding and support pulley mounted to the front of an attachment plate to feed or retrieve wire or cable from an electrical box. An access aperture provides access to the electrical box for hands or tools. Attachment screws 302 secure attachment plate to the electrical box through a plurality of attachment holes. Multiple attachment hole patterns allow use of the guide with various types of electrical boxes and allow attachment of the guide for vertical and horizontal offsets.

21 Claims, 3 Drawing Sheets

WIRE GUIDE FOR ELECTRICAL BOXES

FIELD OF THE INVENTION

The present invention relates to wire guides for pulling wire in conduits and, more particularly, to wire guides attachable to electrical boxes.

BACKGROUND OF THE INVENTION

Many products and tools have been introduced to aid pulling wire and cable in conduits in residential, commercial and industrial buildings. Some of these products address the problems associated with reducing strain and abrasion and cutting damage to wire and cable when pulling through electrical boxes. For example, U.S. Pat. No. 5,271,605 discloses a wire guide device for installation in a tile wall cover. The device fits inside a standard outlet box and utilizes a guide pulley that extends into a junction box. U.S. Pat. No. 4,541,615 discloses a guide roller for feeding electrical wire into a conduit. The roller utilizes a hanging bracket that attaches to holes in an electrical box.

These and other devices, while having utility, lack the flexibility for use with a number of different electrical box types, or for use in different stages of wall construction. For example, some of the devices are designed for one type of box only. Others cannot be used once wall panels surrounding the box have been installed. Many lack structural design for pulling multiple wires or heavy cable. Still others limit access to the interior of an electrical box, complicating retrieval of wire and cable ends and use of tools.

An improved wire and cable guide tool is needed which addresses the shortcomings of present devices used in pulling wire and cable.

OBJECTS AND SUMMARY OF THE INVENTION

Therefore, an object of the present invention is to provide a wire guide for electrical boxes that can be used on a large variety of common electrical connection, utility and junction boxes.

Another object of the present invention is to provide a wire guide for electrical boxes that is robust in design and construction and can be used to pull multiple wires and heavy cable.

Another object of the present invention is to provide a wire guide for electrical boxes that can be used in any stage of wall construction around the electrical box.

Another object of the present invention is to provide a wire guide for electrical boxes that provides maximum access of hands and tools to the interior of the box when installed for ease of use.

Yet another object of the present invention is to provide a wire guide for electrical boxes that allows placement of the guide in 90-degree rotated configurations to allow pulling wire and cable from vertical or horizontal offsets.

Still another object of the present invention is to provide a wire guide for electrical boxes that is simple and low in cost.

The wire guide of the present invention comprises a shallow V-groove pulley rotateably attached to the front of an attachment plate. The attachment plate utilizes a number of attachment through-hole patterns corresponding to, and aligning with, threaded cover plate holes of a variety of standard electrical utility, connection and junction boxes. At least some of the through-hole patterns utilize twice the holes as cover plate screws used in the boxes to allow 90-degree rotation of the attachment plate with respect to the box. The forward position of the pulley so that it does not extend beyond the back face of the attachment plate allows attachment and use of the device even if wall panels have been installed up to the box.

The attachment plate utilizes a large access hole or aperture through the plate for hand and tool access inside the box with the guide attached. The access hole utilizes outwardly extending lobes so that the radius from a geometric center of the attachment hole patterns to the outer portions of the lobes is a greater distance than the closest distance from the geometric center of the attachment hole patterns to the attachment holes.

The simple and robust design of the guide allows multiple wires and heavy cable to be supported by the device.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

The following is a description of the preferred embodiments of a wire guide for electrical boxes.

Figure 1:
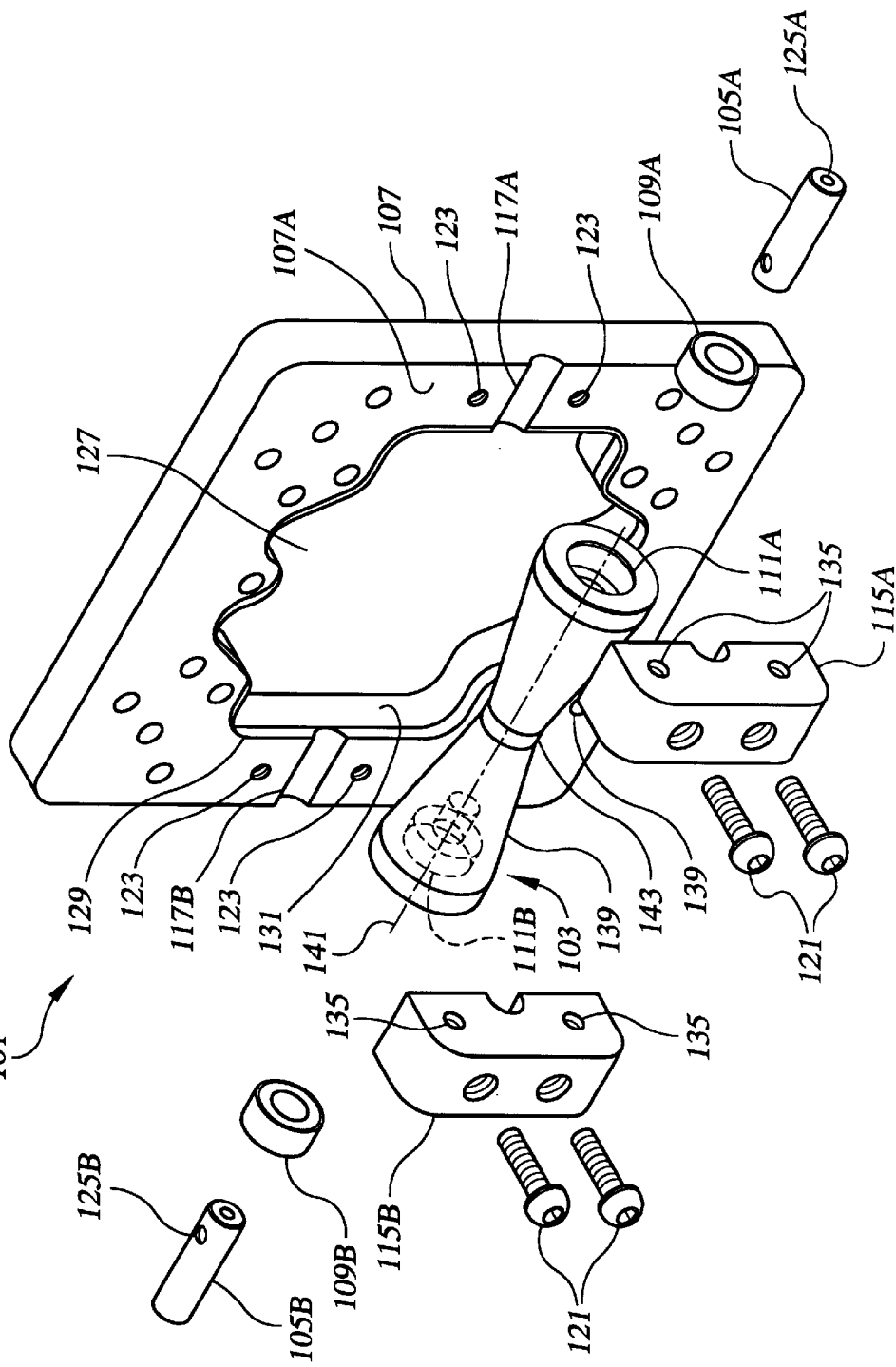
FIG. 1 is an exploded view of the wire guide showing the attachment plate with central access aperture, a V-groove pulley supported by shafts and bearings on either end of the pulley, and clamp blocks for clamping the shafts to the attachment plate.

FIG. 1 is an exploded view of wire guide 101 showing a wire pulley 103 supported by shafts 105A, 105B to attachment plate 107. In the preferred embodiments, wire pulley 103 is a generally shallow V-groove pulley providing rolling support of a wire as it is fed into, or pulled from, an electrical box as shown in FIG. 3.

Bearings such as needle bearings 109A, 109B, secured into recesses 111A, 111B of pulley 103 by a press fit provide a low-resistance means of rolling support of pulley 103 on shafts 105A, 105B. Clamp blocks 115A, 115B clamp shafts 105A, 105B into cylindrical grooves 117A, 117B on the front face 107A of attachment plate 107. Fasteners such as cap screws 121 fasten clamp blocks 115A, 115B to attachment plate 107 by engagement with threaded holes 123. Drilled lubrication holes 125A, 125B in shafts 105A, 105B provide a means for lubrication of bearings 109A, 109B.

Figure 3:
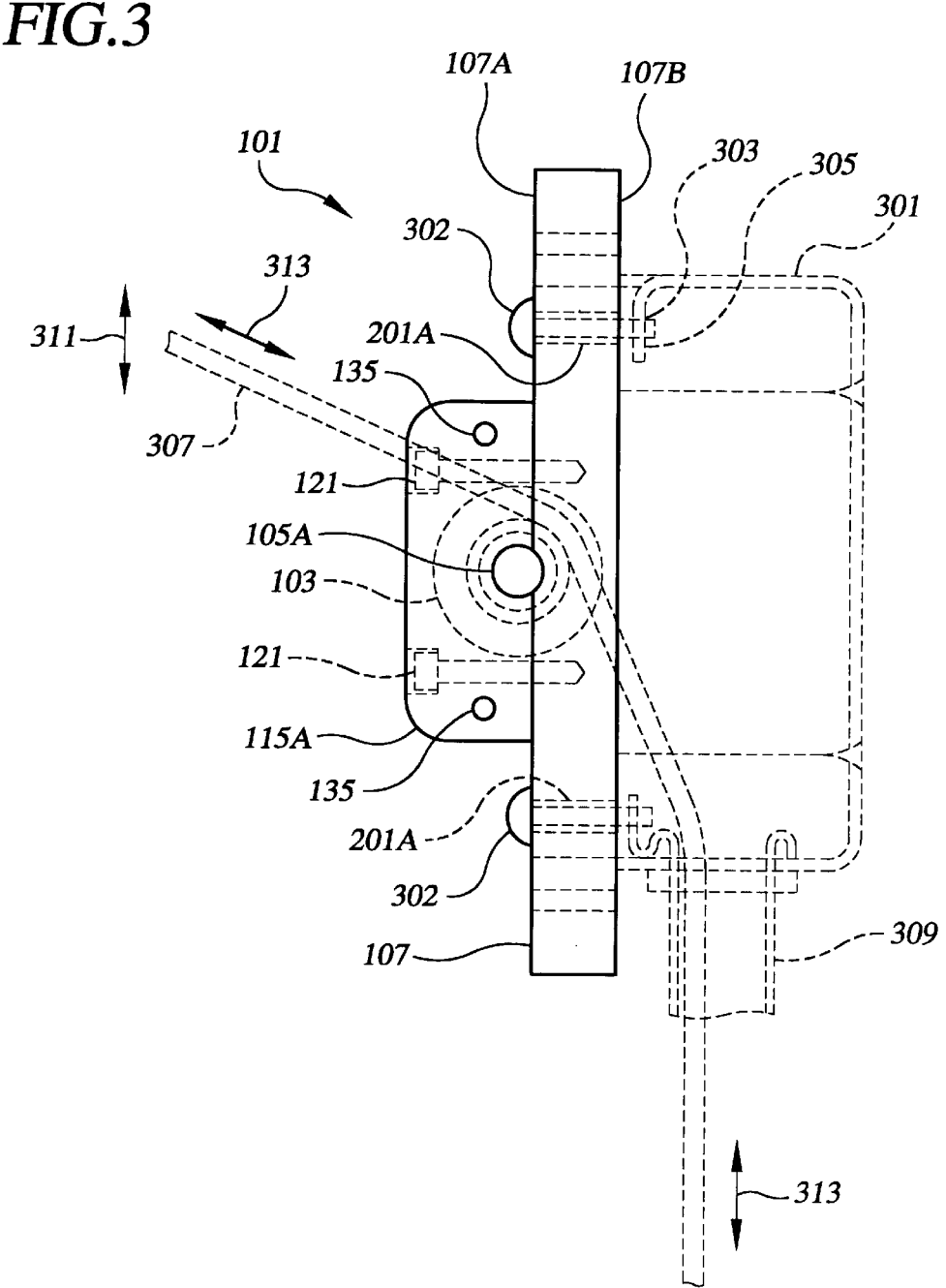
FIG. 3 is a side elevation drawing of the wire guide of FIG. 1 attached to an electrical box with the pulley supporting a wire being pulled through a conduit connected to the box.

Access aperture 127 provides access for wire or cable routed into, and out of, an electrical box as shown in FIG. 3. Chamfered edge 129 provides protection from abrasion or cutting of the wire or cable if in contact with interior surface 131 of aperture 127.

Figure 2:
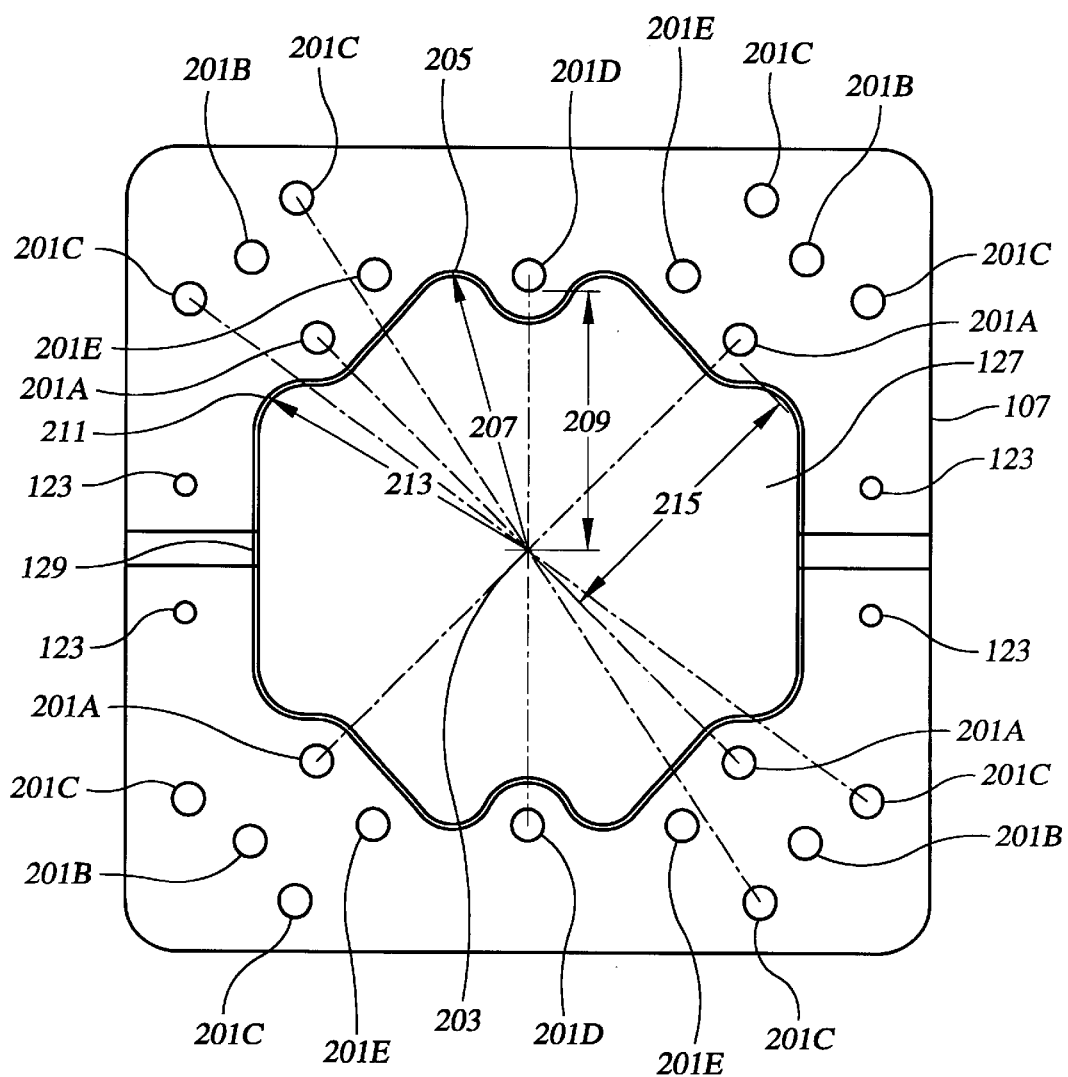
FIG. 2 is a front view of the attachment plate of FIG. 1 showing the multiple through-hole patterns for attachment to a variety of electrical boxes.

FIG. 2 is a front view of attachment plate 107 showing access aperture 127 and several sets of attachment holes for attaching plate 107 of guide 101 to an electrical box such as octagon box 301 of FIG. 3. For example, attachment holes 201A are positioned to align with threaded holes 303 of cover support ledges 305 of octagon box 301 of FIG. 3. Standard octagon electrical boxes utilize only a pair of cover plate threaded holes 303 and cover support ledges 305. Use of four holes 201A provide a means to attach wire guide 101 in any of four quadrants (90 degree rotations). The ability to rotate the guide in 90-degree quadrants allows the wire to be fed from a variety of directions.

Attachment holes 201B are positioned to align with the cover attachment holes of a standard 4" electrical box. As in the case of holes 201A, four holes positioned as shown allows guide 101 to be rotated in 90 degree quadrants, even though standard 4" boxes have only two lid attachment holes.

Attachment holes 201C are positioned to align with cover attachment holes of a standard 4¹¹⁄₁₆" electrical box. Use of eight holes (double the number of cover attachment holes in the electrical box) allows attachment in 90-degree rotation quadrants. Holes 201D are positioned to align with threaded cover plate attachment holes in standard receptacle boxes, and holes 201E are positioned to align with double receptacle boxes.

Point 203 defines the geometric center of the arrays of holes 201A, 201B, 201C, 201D, and 201E. Lines shown in the figure illustrate the center of arrays for holes 201A, 201C and 201D. In the preferred embodiment, point 203 also represents the geometric center of access aperture 127.

In the preferred embodiments, access aperture 127 is enlarged to a maximum practical amount in order to provide adequate space for multiple wire and cables, and to provide access for fingers and tools inside the electrical box during use. Aperture lobes such as lobes 205 extend outward from geometric center 203 greater than the distance to the most inward attachment holes. For example, distance 207 to lobe 205 from geometric center 203 exceeds distance 209 to attachment hole 201D. Distance 213 to lobe 211 exceeds distance 215 to attachment hole 201A.

FIG. 3 is a side elevation drawing of attachment plate 107 of wire guide 101 fastened to an electrical box such as octal box 301. Cap screws 121 fasten clamp block 115A to attachment plate 107, clamping shaft 105A to plate 107. The diameter of pulley 103, plate 107 thickness and positioning of shaft 105A are selected to ensure that pulley 103 does not extend beyond the back 107B of plate 107. This ensures that the device may be used with small boxes such as outlet boxes and when wall structure may otherwise interfere with the installed wire guide.

Plate attachment screws 302 pass through attachment holes 201A and are engaged to threaded holes 303 of cover support ledges 305. In the preferred embodiments, threaded attachment screw holes 135 on clamp blocks 115A, 115B provide a storage location for attachment screws 302 when not in use. Wire pulley 103 provides rolling support to wire 307 as it is pulled into or, out of, conduit 309 fixed to box 301. In FIG. 3, shaft 105A of wire pulley 103 is shown in a horizontal position, allowing pulley 103 to provide wire feed 313 and support when offset in a vertical, or near-vertical direction 311. Upon rotation of guide 101 as described above, pulley 103 provides wire feed and support when offset in a horizontal, or hear-horizontal direction.

In the preferred embodiments, attachment plate 107 is made of aluminum plate and anodized in order to provide corrosion protection and reduce friction of wire on access aperture surfaces such as chamfer 129 and interior surface 131 if FIG. 1. Wire pulley 103 is machined from aluminum rod, clamp blocks 115A, 115B are machined from aluminum shapes. Shafts 105A, 105B are hardened steel. In other embodiments, other metals or high-strength engineered plastic materials may be used. Plate 107 and clamp blocks 115A, 115B may be integrally molded or fabricated from metals or high-strength plastics.

In the preferred embodiments, pulley 103 is a V-groove pulley having shallow (less than 30 degrees) bearing surfaces 139 with centerline axis 141. The shallow bearing surface angle provides a small centering bias on the wire or cable during pulling, yet allows use of conduit offset with respect to the centerline of the box. On other embodiments, a truncated or flat portion 143 of the pulley extends for a portion of width of the pulley. Pulley 103 extends the substantial width of aperture 127, and in the preferred embodiments, extends at least 60% of the width of wire guide 101. Other embodiments utilize a single shaft extending through pulley 103. Journal bearings may be used instead of ball or needle bearings. Still other embodiments utilize two or more access holes instead of a single large hole.

Accordingly, the reader will see that the Wire Guide for Electrical Boxes provides a device for pulling wire and cable in a variety of electrical boxes. The device provides the following additional advantages:

The guide can be rotated 90 degrees and mounted to the electrical box for offset pulling from a horizontal or vertical direction;

The guide provides a large access aperture for better viewing and insertion of hands or tools;

The guide can be used with electrical boxes in any stage of wall construction; and The device is robust, simple and low in cost.

Although the description above contains many specifications, these should not be construed as limiting the scope of the invention but merely providing illustrations of some of the presently preferred embodiments of this invention. Thus the scope of the invention should be determined by the appended claims and their legal equivalents, rather than by the examples given.

I claim:

1. A wire guide for use with electrical boxes, the guide comprising:

an attachment plate comprising a front, a back, an access aperture and a plurality of access plate attachment holes, said plurality of access plate attachment holes comprising a first predetermined pattern matching attachment elements of a first electrical box and defining a geometric center of said first predetermined pattern;

a wire pulley rotateably fixed to said plate wherein an entire portion of said wire pulley extends forward of said back of said attachment plate;

wherein a first distance from said geometric center of said first predetermined pattern to a surface portion of said access aperture is greater than a second distance between said geometric center of said first predetermined pattern to at least one attachment hole of said first predetermined pattern.

2. The wire guide of claim 1 wherein said second distance is the greatest distance between said geometric center of said first predetermined pattern and at least a pair of attachment holes of said first predetermined pattern.

3. The wire guide of claim 1 wherein said geometric center of said first predetermined pattern is a geometric center of said access aperture.

4. The wire guide of claim 1 comprising a second predetermined pattern of attachment holes matching attachment elements of a second electrical box and defining a geometric center of said second predetermined pattern.

5. The wire guide of claim 4 wherein said geometric center of said second predetermined pattern is coincident with said geometric center of said first predetermined pattern.

6. The wire guide of claim 1 wherein said first predetermined pattern comprises at least twice a number of attachment holes as a number of said matching attachment elements of said first electrical box whereby said first predetermined pattern allows alignment of said attachment plate in 90-degree rotations with said attachment elements of said first electrical box.

7. The wire guide of claim 1 wherein said wire pulley extends a substantial width of said access aperture.

8. The wire guide of claim 7 wherein said wire pulley comprises a generally V-shaped cross section with bearing surfaces defining an angle of less than 30 degrees with a rotational centerline of said wire pulley.

9. The wire guide of claim 1 wherein said wire pulley is rotateably supported by a shaft clamped to said front of said attachment plate by a first clamp block.

10. The wire guide of claim 1 wherein said wire pulley is rotateably supported by a first shaft disposed in a first end of said wire pulley and a second shaft disposed in a second end of said wire pulley, said first shaft clamped to said front of said attachment plate by a first clamp block and said second shaft clamped to said front of said attachment plate by a second clamp block.

11. The wire guide of claim 10 comprising a first shaft bearing fixed in said first end of said wire pulley and a second bearing fixed in said second end of said wire pulley.

12. The wire guide of claim 1 comprising a threaded aperture for storage of an attachment screw for attachment of said attachment plate to said first electrical box.

13. A wire guide for use with electrical boxes, the guide comprising:

an electrical box attachment portion comprising a front and a back, an access aperture and a plurality of predetermined attachment hole patterns, a first of said plurality of predetermined attachment hole patterns comprising two sets of through-holes, each of said two sets of through-holes comprising at least a pair of said through-holes aligning with at least a pair of threaded cover plate attachment holes in a first of said electrical boxes, and one of said each of two sets of through-holes offset 90 degrees with another of said each of two sets of through-holes whereby said attachment plate is attachable at 90-degree rotations with respect to said first electrical box; and a pulley rotateably fixed to said attachment portion wherein no portion of said pulley extends beyond said back of said attachment portion.

14. The wire guide of claim 13 whereby said plurality of predetermined attachment hole patterns comprises a second attachment hole pattern comprising two second sets of through-holes, each of said two second sets comprising at least a second pair of said through-holes aligning with at least a second pair of threaded cover plate attachment holes in a second of said electrical boxes, and one of said each of said two second sets of through-holes offset 90 degrees with another of said each of said two sets of through-holes whereby said attachment plate is attachable at 90-degree rotations with respect to said second electrical box.

15. The wire guide of claim 13 wherein said attachment portion comprises a plate comprising a front, a back and said access aperture, and said pulley is rotateably fixed to said front of said plate and covering a portion of said access aperture.

16. The wire guide of claim 15 wherein said pulley is rotateably fixed to said front of said plate by a shaft clamped to said front of said plate by a clamp block, said shaft engaged with a bearing disposed on a first end of said pulley.

17. The wire guide of claim 13 comprising a means to reduce abrasion of wire through said access aperture.

18. The wire guide of claim 17 wherein said means to reduce abrasion of wire through said access aperture is a chamfer edge on said access aperture.

19. The wire guide of claim 13 comprising a means to store an attachment screw.

20. The wire guide of claim 13 wherein said access aperture comprises a plurality of access lobes extending outward from a geometrical center of said first of said plurality of predetermined attachment hole patterns.

21. The wire guide of claim 20 wherein a first distance from said geometrical center to a surface portion of one of said plurality of access lobes is greater than a second distance from said geometric center to a through-hole of said first of said plurality of predetermined attachment hole patterns.

* * * * *